United States Patent Office 3,051,713
Patented Aug. 28, 1962

3,051,713
$\Delta^{3-14}$-ISORESERPIC ACID LACTONE
Georges Muller, Nogent-sur-Marne, France, assignor, by mesne assignments, to Roussel-UCLAF, S.A., Paris, France, a corporation of France
No Drawing. Filed Feb. 11, 1958, Ser. No. 714,473
4 Claims. (Cl. 260—287)

This invention relates to esters of polycyclic acids and to a method for their preparation. More particularly, the invention relates to racemic and optically active methyl $\Delta^{3,(14)}$-dehydroreserpates and to intermediates used in their preparation.

In accordance with the present invention a method is provided for the preparation, in both its racemic and optically active forms, of the new compound methyl $\Delta^{3(14)}$-dehydroreserpate having the formula

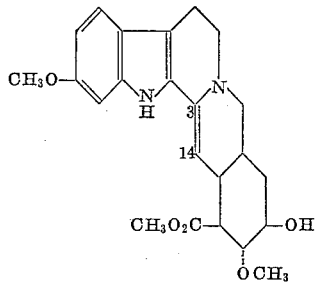

The invention also provides a method for the synthesis of a new lactone intermediate in both its racemic and optically active forms, from which the methyl dehydroreserpate is made by conversion with an alkaline methoxide, namely the lactone of 18β-hydroxy-11,17α-dimethoxy-16β-carboxy-3(14)-dehydro - 20α - yohimbane. Both the lactone and the methyl dehydroeserpate prepared therefrom are valuable novel materials in the synthetic production of reserpine, since the methyl $\Delta^{3(14)}$-dehydroreserpate may be reduced by known methods to methyl reserpate, from which reserpine itself may be obtained directly. Reserpine is an alkaloid having known valuable pharmacodynamic and tranquilizer properties. The methyl dehydroreserpate may also be transformed into valuable drugs by esterification of the free hydroxy group by means of an acid, said acid being applied in the form of an active functional derivative, such as an anhydride, a mixed anhydride, or an acid chloride, in presence of a suitable condensing agent under conventional reaction conditions. Examples of acids which may be employed to esterify methyl $\Delta^{3(14)}$-dehydroreserpate in this manner include substituted benzoic or cinnamic acids, such as 3.4.5-trimethoxybenzoic acid or 3.4.5-trimethoxycinnamic acid, In order better to understand the relationships existing among the starting materials, intermediates, and final products, reference may be had to the following equations:

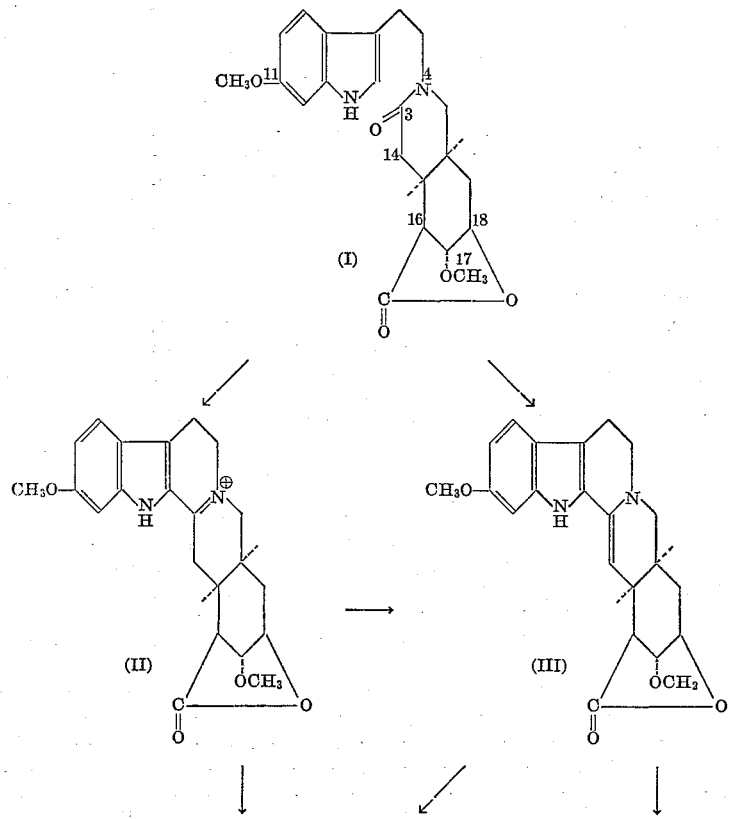

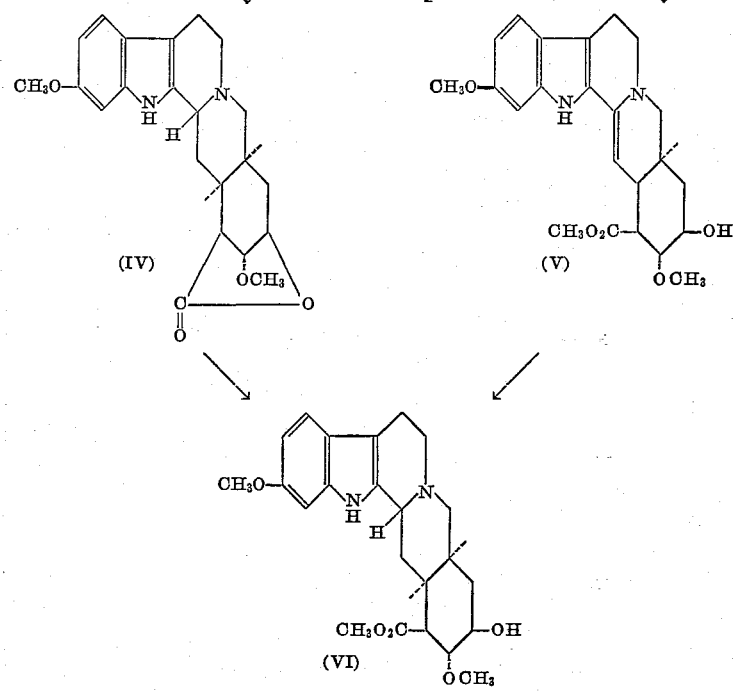

In these equations, the starting material (I) is the lactone of 18β-hydroxy-11,17α-dimethoxy-3-oxo-16β-carboxy-2,3-seco-20α-yohimbane, and compound (II) is the quaternary base derived from (I). Compound (I) and this quaternary base (II) are prepared by saponification of 18β - acetoxy - 11,17α - dimethoxy - 3 - oxo - 16β - methoxy-carbonyl-2,3-seco-20α-yohimbane, followed by a lactonization of the hydroxylated acid thus obtained and cyclization of the latter to form the quaternary base. The quaternary base (II) cannot be purified, and salt formation is required to isolate it. This complicates its use in subsequent conversions, so that, for example, its transformation into the lactone of reserpic acid (IV) involves a reduction, the yield of which is quite low.

It has now been found that the lactone of 18β-hydroxy-11,17α - dimethoxy - 3 - oxo - 16β - carboxy - 2,3 - seco-20α-yohimbane (I) may be converted directly into the lactone of 18β-hydroxy-11,17α-dimethoxy-16β-carboxy-3(14)-dehydro-20α-yohimbane (III), if the cyclization, for example with phosphorus oxychloride, is followed by an ammonia treatment which has the effect of causing a migration of the double bond of the quaternary base (II) from 3,4 into 3,14, without the necessity of isolating the latter. Lactone III is a new compound, which, in addition to producing the methyl Δ³⁽¹⁴⁾-dehydroreserpate of the invention, crystallizes and is easily purified. It represents a valuable intermediate product in the synthesis of reserpine. It is possible to convert it, by reduction with zinc in acetic acid, for example, into reserpic acid lactone (IV), from which methyl reserpate (VI) and reserpine may be produced.

The process of the invention consists substantially in treating the racemic or optically active lactone of 18β-hydroxy-11,17α-dimethoxy - 3 - oxo-16β-carboxy-2,3-seco 20α-yohimbane (I) with phosphorus oxychloride. The excess reagent is eliminated, it is taken up cold with a suitable solvent, such as a lower aliphatic alcohol as, for example, methanol, concentrated ammonia is added, then, water, and the resulting lactone of 18β-hydroxy-11,17α-dimethoxy-16β-carboxy-3(14) - dehydro 20α-yohimbane (III) is extracted. The extraction is carried out with a solvent such as methylene chloride, which is not miscible with water. Said lactone is crystallized, is treated with an alkaline methoxide, such as, for example, sodium methylate, under methanol reflux, is evaporated to dryness in vacuo, is treated with ammonia, extraction is performed according to the usual methods, and the racemic or optically active methyl Δ³⁽¹⁴⁾-dehydroreserpate (V) is isolated.

The examples which follow serve to illustrate preferred embodiments of the invention without however limiting its scope as defined in the appended claims. It will be understood that it is possible to change the nature of the solvents and of the reagents, the temperatures, reaction times and the order of introducing the reagents without thereby exceeding the scope of the invention. The melting points given are corrected; they represent instantaneous melting and have been determined on the Maquenne block.

EXAMPLE 1

*Preparation of Lactone of 18β-Hydroxy-11,17α-Dimethoxy-16β-Carboxy-3(14) - Dehydro-20α - Yohimbane III*

A. *Racemic lactone.*—1.5 g. of racemic lactone of 18β-hydroxy - 11,17α - dimethoxy-3-oxo-16β-carboxy-2,3-seco-20α-yohimbane (I) are refluxed with 30 cc. of phosphorus oxychloride for two hours. The excess phosphorus oxychloride is expelled by distillation to dryness in vacuo, and the residue is taken up with 7.5 cc. of cold methanol. The solution is chilled to 0° C., and concentrated ammonia is added until there is alkaline reaction and no further precipitation. 30 cc. of water are added, extraction is carried out with methylene chloride, the combined extracts are dried over magnesium sulfate and evaporated to dryness in vacuo. The residue is taken up with 30 cc. of acetone, iced and centrifuged and produces 1.175 g. (82%) of the racemic lactone of 18β-hydroxy-11,17α-dimethoxy-16β - carboxy-3(14)-dehydro-20α-yohimbane, M.P.=295–300° C. This product which has not been described previously takes the form of small yellow prismatic crystals, insoluble in water and ether, difficultly soluble in acetone, soluble in methylene chloride.

*Analysis.*—$C_{22}H_{24}O_4N_2=380.43$: Calculated, C percent 69.45; H percent 6.36; N percent 7.36; O percent 16.82.

Found, C percent 69.4; H percent 6.4; N percent 7.2; O percent 16.9.

B. *Dextrorotatory lactone.*—2.15 g. of the levorotatory lactone of 18β-hydroxy-11,17α-dimethoxy - 3 - oxo-16β-carboxy-2,3-seco-20α-yohimbane (I), $[\alpha]_D^{20} = -83°$ C. (c.=0.25%, ethanol), are refluxed with 43 cc. of phosphorus oxychloride for two hours. The excess phosphorus oxychloride is expelled by distillation to dryness in vacuo, and the residue is taken up with 43 cc. of cold methanol. This is chilled to 0° C., and concentrated ammonia is added until the reaction is alkaline and there is no more precipitation. 86 cc. of methylene chloride are added, the solution is washed with water, dried over magnesium sulfate and concentrated to small volume. After centrifuging, 1.73 g. (84%) of dextrorotatory lactone of 18β-hydroxy-11,17α-dimethoxy - 16β - carboxy-3(14)-dehydro-20α-yohimbane are isolated, M.P. above 310° C., $[\alpha]_D^{20} = +12°$ C.±5° (c.=0.275%, dimethylformamide). The product which is new takes on the form of small yellow hexagonal prisms, insoluble in water and ether, soluble in methylene chloride.

*Analysis.*—$C_{22}H_{24}O_4N_2$=380.43: Calculated, C percent 69.45; H percent 6.36; N percent 7.36; O percent 16.82. Found, C percent 69.0; H percent 6.3; N percent 7.2; O percent 16.9.

EXAMPLE 2

*Preparation of Methyl $\Delta^{3(14)}$-Dehydroreserpate (V)*

A. *Racemic methyl $\Delta^{3(14)}$-dehydroreserpate.*—1.175 g. of lactone of 18β-hydroxy-11,17α-dimethoxy-16β-carboxy 3(14)-dehydro-20α-yohimbane (III), prepared according to Example 1A, is introduced into 56 cc. of anhydrous methanol, and 7.2 cc. of a methanol solution of sodium methylate having 1 mg. Na/cc. is added; the solution is then heated on reflux for two hours. 0.6 cc. of acetic acid are added, the methanol is expelled in vacuo, concentrated ammonia is added until the pH is above 13, extraction is carried out with ether, the ether extract is washed with water, is dried over magnesium sulfate and is concentrated to 10 cc. On centrifuging there is isolated 1.125 g. (88.5%) of racemic methyl $\Delta^{3(14)}$-dehydroreserpate, M.P. about 160° C. The product, which has not been described previously, takes the form of small yellow hexagonal crystals, insoluble in water, soluble in ether.

*Analysis.*—$C_{23}H_{28}O_5N_2$=412.47: Calculated, C percent 66.97; H percent 6.84; N percent 6.79; O percent 19.40. Found, C percent 66.4; H percent 6.8; N percent 6.7; O percent 19.5.

B. *Dextrorotatory methyl $\Delta^{3(14)}$ - dehydroreserpate.*— 1.75 g. of dextrorotatory lactone of 18β-hydroxy-11,17α-dimethoxy-16β - carboxy - 3(14) - dehydro-20α-yohimbane (III), prepared according to Example 1B, are introduced into 87 cc. of anhydrous methanol, and 10.4 cc. of a methanol solution of sodium methylate having 1 mg. Na/cc. are added; the solution is then heated on reflux for two hours. It is concentrated in vacuo to 3 cc., and 1.74 g. (92%) of dextrorotatory methyl $\Delta^{3(14)}$-dehydroreserpate are separated, M.P.=235° C., $$[\alpha]_D^{20} = +65° \text{ C.}$$

(c.=0.5%, dimethylformamide). The product, which is new, is polymorphous. Recrystallized in ether, in which it is not very soluble, it melts at 170° C. It takes the form of small yellow crystals.

*Analysis.*—$C_{23}H_{28}O_5N_2$=412.47: Calculated, C percent 66.97; H percent 6.84; N percent 6.79; O percent 19.40. Found, C percent 66.9; H percent 6.8; N percent 6.8; O percent 19.3.

EXAMPLE 3

*Reduction of Lactone of 18β-Hydroxy-11,17α-Dimethoxy-16β-Carboxy 3(14)-Dehydro-20α-Yohimbane (III)*

300 mg. of dextrorotatory lactone of 18β-hydroxy-11,17α-dimethoxy - 16β - carboxy - 3(14) - dehydro-20α-yohimbane, prepared according to Example 1B, are dissolved in 12 cc. of acetic acid. The solution is refluxed, 600 mg. of zinc dust are added, and heating is continued for one hour. The solution is cooled to 20° C., filtered and evaporated in vacuo until almost dry. The residue is taken up with water, is neutralized with ammonia and extracted with methylene chloride. It is dried over magnesium sulfate, evaporated to dryness in vacuo, taken up with a little ethyl acetate and centrifuged thereby producing 125 mg. (40%) of lactone of reserpic acid (IV). The product thus obtained is absolutely identical with a sample of lactone of reserpic acid.

I claim:

1. 3-dehydro-isoreserpic acid lactone of the formula

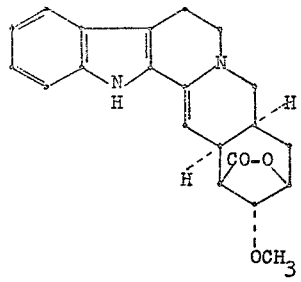

2. The dextrorotatory lactone of 18β-hydroxy-11,17α-dimethoxy-16β-carboxy-3(14)-dehydro-20α-yohimbane.

3. The method of preparing 3-dehydro-isoreserpic acid lactone of the formula

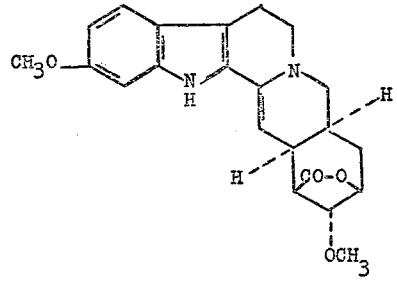

which comprises reacting the lactone of 18β-hydroxy-11,17α - dimethoxy - 3 - oxo - 16β - carboxy-2,3-seco-20α-yohimbane with phosphorus oxychloride, dissolving the reaction product in an inert organic solvent, treating with concentrated ammonia and recovering said 3-dehydro-isoreserpic acid lactone.

4. In a process of producing the lactone of 18β-hydroxy - 11,17α - dimethoxy - 16β - carboxy-3(14)-dehydro-20α-yohimbane, the steps which comprise heating under reflux the lactone of 18β-hydroxy-11,17α-dimethoxy-3-oxo - 16β - carboxy-2,3-seco-20α-yohimbane with phosphorus oxychloride to cause ring closure, distilling off in a vacuum excess phosphorus oxychloride, dissolving the distillation residue in methanol, and adding ammonia to the solution at a temperature of about 0° C. until the solution has attained alkaline reaction and precipitation is completed.

References Cited in the file of this patent

UNITED STATES PATENTS 2,809,198    Huebner _____ Oct. 8, 1957
2,977,365    Weisenborn et al. _____ Mar. 28, 1961

OTHER REFERENCES

MacPhillamy et al.: Journ. Am. Chem. Soc., vol. 77, pages 4335–4338, Aug. 20, 1955.

Weisenborn et al.: Vol. 78, ibid, pages 2022–2023, May 5, 1956.

Woodward et al.: Vol. 78, ibid, pages 2023–2025, May 5, 1956.

UNITED STATES PATENT OFFICE
CERTIFICATE OF CORRECTION

Patent No. 3,051,713            August 28, 1962

Georges Muller

It is hereby certified that error appears in the above numbered patent requiring correction and that the said Letters Patent should read as corrected below.

Column 6, lines 15 to 25, the formula should appear as shown below instead of as in the patent:

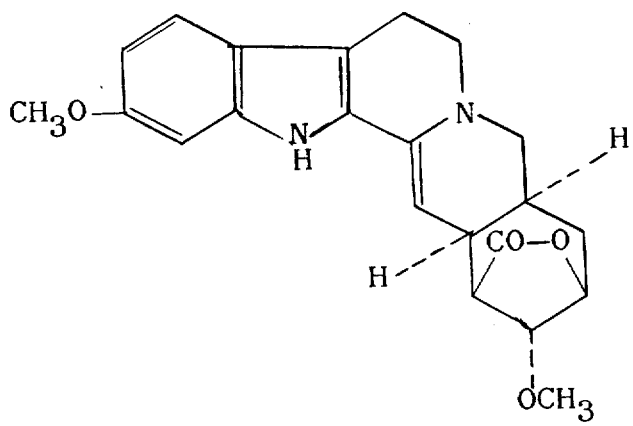

Signed and sealed this 22nd day of January 1963.

(SEAL)
Attest:
ERNEST W. SWIDER
Attesting Officer

DAVID L. LADD
Commissioner of Patents